(12) United States Patent
Richmond et al.

(10) Patent No.: US 8,197,686 B2
(45) Date of Patent: Jun. 12, 2012

(54) FUEL FILTER CARTRIDGE AND KEYED END CAP

(75) Inventors: Thomas C. Richmond, Kearney, NE (US); Steven M. Todd, Kearney, NE (US); Kenneth W. Stirn, Kearney, NE (US); Farrell F. Calcaterra, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 1222 days.

(21) Appl. No.: 11/950,010

(22) Filed: Dec. 4, 2007

(65) Prior Publication Data

US 2008/0073262 A1    Mar. 27, 2008

Related U.S. Application Data

(63) Continuation-in-part of application No. 10/940,002, filed on Sep. 13, 2004, now Pat. No. 7,326,342.

(51) Int. Cl.
*B01D 35/153* (2006.01)
*B01D 37/00* (2006.01)

(52) U.S. Cl. ........ 210/234; 210/767; 210/148; 210/235; 210/237; 210/457

(58) Field of Classification Search .................. None
See application file for complete search history.

(56) References Cited

U.S. PATENT DOCUMENTS

| | | |
|---|---|---|
| 3,567,023 A | 3/1971 | Buckman et al. |
| 3,726,403 A | 4/1973 | Shaltis |
| 3,931,011 A | 1/1976 | Richards et al. |
| 4,502,307 A | 3/1985 | Grunewald |
| 4,581,135 A | 4/1986 | Gerulis |
| 4,619,764 A | 10/1986 | Church et al. |
| 4,836,923 A | 6/1989 | Popoff et al. |
| 4,935,127 A | 6/1990 | Lowsky et al. |
| 5,035,797 A | 7/1991 | Janik |
| 5,049,269 A | 9/1991 | Shah |
| 5,186,829 A | 2/1993 | Janik |
| 5,486,288 A | 1/1996 | Stanford et al. |
| 5,538,626 A | 7/1996 | Baumann |
| 5,690,816 A | 11/1997 | Covington |
| 5,753,107 A | 5/1998 | Magnusson et al. |
| 5,766,463 A | 6/1998 | Janik et al. |
| 5,770,054 A | 6/1998 | Ardes |
| 5,826,854 A | 10/1998 | Janvrin et al. |
| 5,837,137 A | 11/1998 | Janik |
| 5,888,384 A | 3/1999 | Wiederhold et al. |
| 5,922,199 A | 7/1999 | Hodgkins |
| 6,006,924 A | 12/1999 | Sandford |

(Continued)

FOREIGN PATENT DOCUMENTS

DE    42 43 217    6/1994

(Continued)

*Primary Examiner* — Krishnan S Menon
*Assistant Examiner* — Allison M Gionta
(74) *Attorney, Agent, or Firm* — Reinhart Boerner Van Deuren P.C.

(57) ABSTRACT

A filter cartridge has a keyed end cap which is configured and shaped for unlocking an associated valve mechanism that comprises a latch device and a valve. In this manner, when the fuel filter cartridge is placed into a fuel filter housing having such a latch and valve mechanism, the fuel filter cartridge is operable therein to filter fluid and pass the fluid into a standpipe contained within the fuel filter housing. The fuel filter cartridge of this type generally includes pleated filter paper which is disposed between two opposed end caps. The keys may be provided along the bottom end cap.

14 Claims, 19 Drawing Sheets

U.S. PATENT DOCUMENTS

| | | |
|---|---|---|
| 6,096,199 A | 8/2000 | Covington |
| 6,139,738 A | 10/2000 | Maxwell |
| 6,146,527 A | 11/2000 | Oelschlaegel |
| 6,174,438 B1 | 1/2001 | Hodgkins et al. |
| 6,189,513 B1 | 2/2001 | Brown et al. |
| 6,235,194 B1 | 5/2001 | Jousset |
| 6,248,236 B1 | 6/2001 | Hodgkins |
| 6,475,379 B2 | 11/2002 | Jousset et al. |
| 6,495,042 B1 | 12/2002 | Knight |
| 6,506,302 B2 | 1/2003 | Janik |
| 6,554,139 B1 | 4/2003 | Maxwell et al. |
| 6,555,000 B2 | 4/2003 | Knight |
| 7,326,342 B2 | 2/2008 | Richmond et al. |

FOREIGN PATENT DOCUMENTS

| | | |
|---|---|---|
| EP | 0 880 987 A1 | 12/1998 |
| JP | 2000-140525 | 5/2000 |
| WO | WO 95/13468 | 5/1995 |
| WO | WO 01/39859 A1 | 6/2001 |
| WO | WO 02/078816 A1 | 10/2002 |
| WO | WO 2006/112853 | 10/2006 |

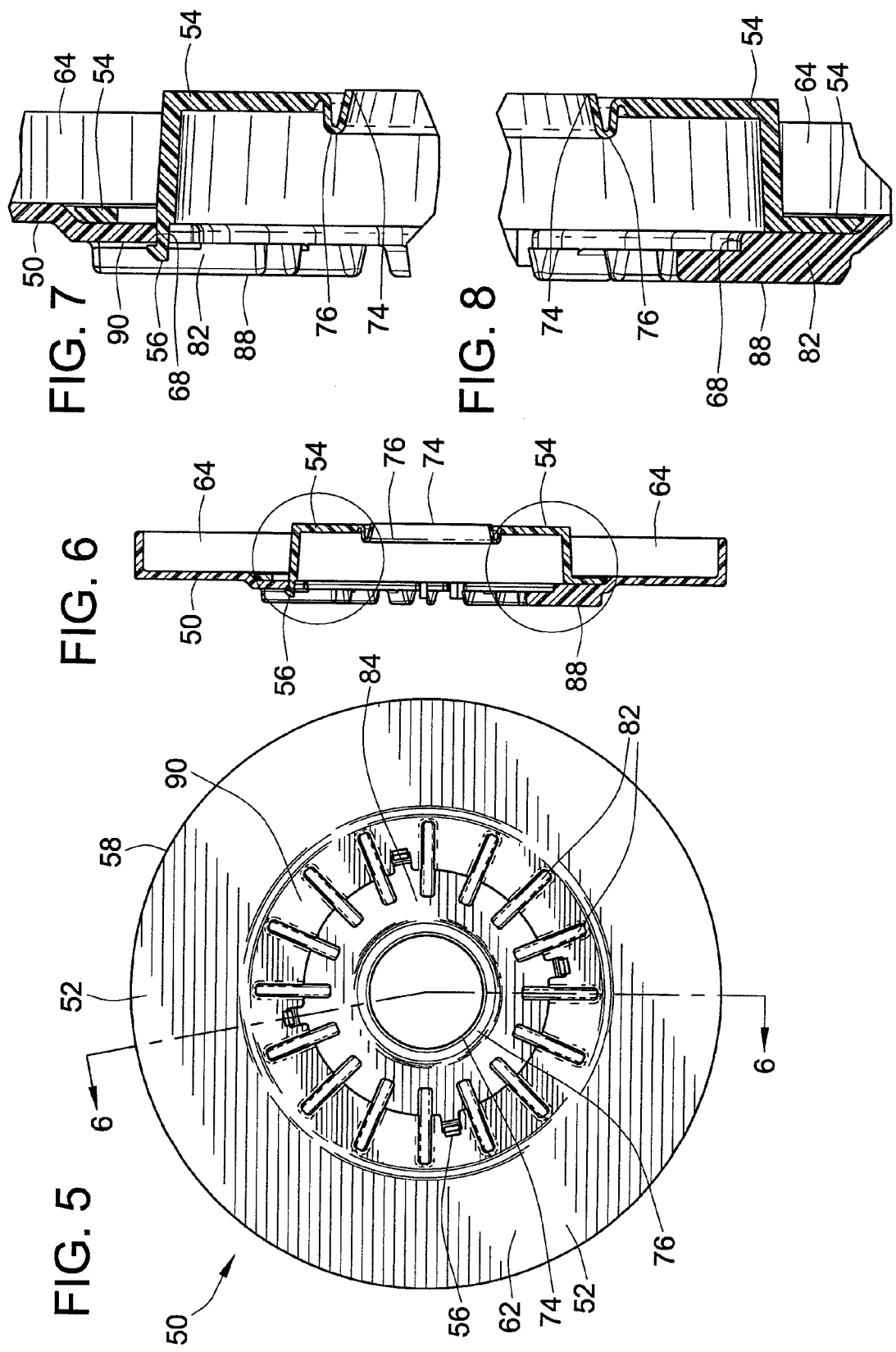

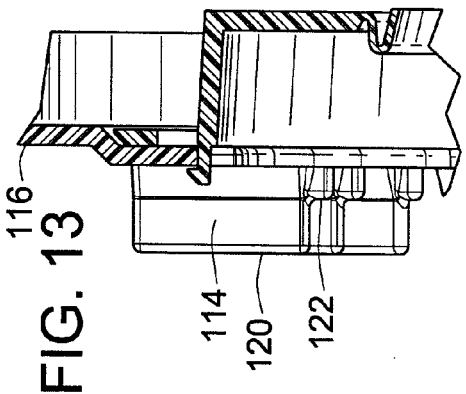
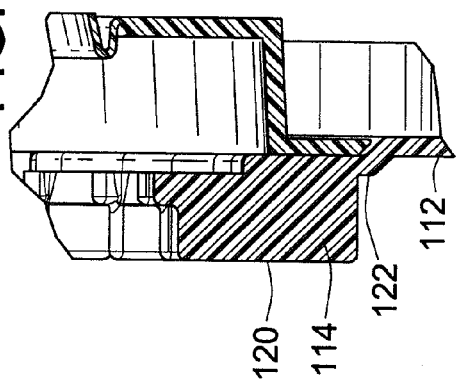
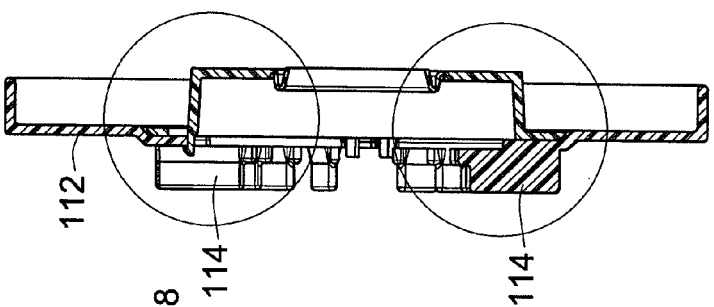
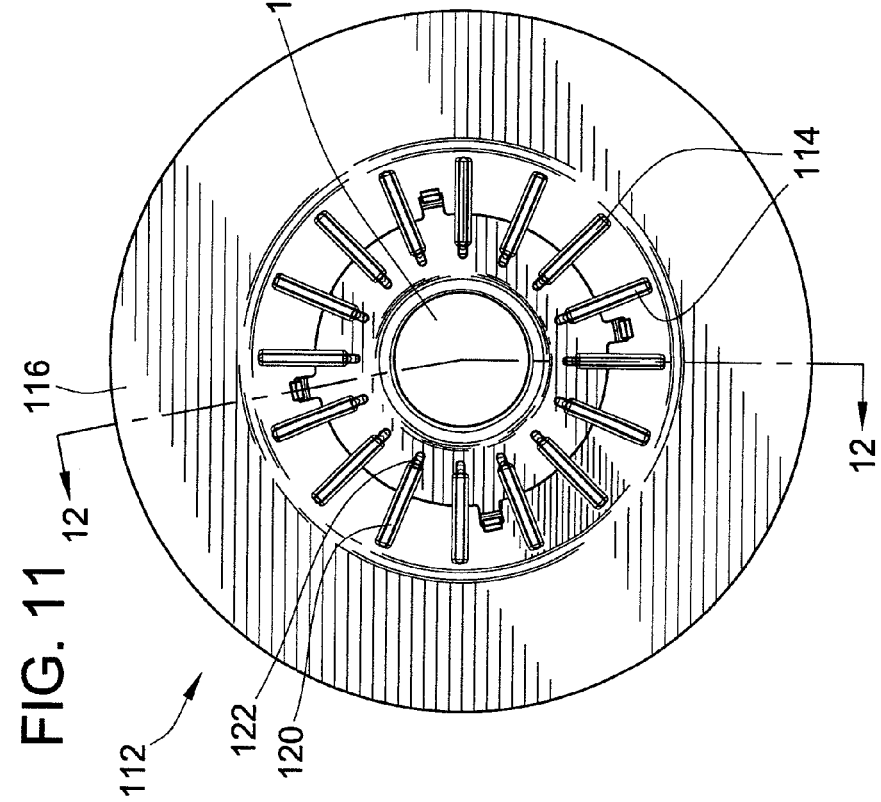

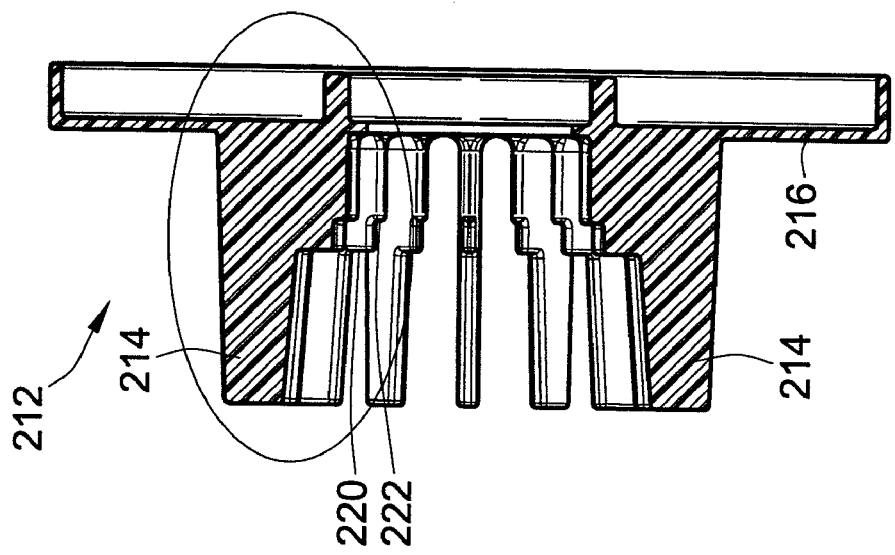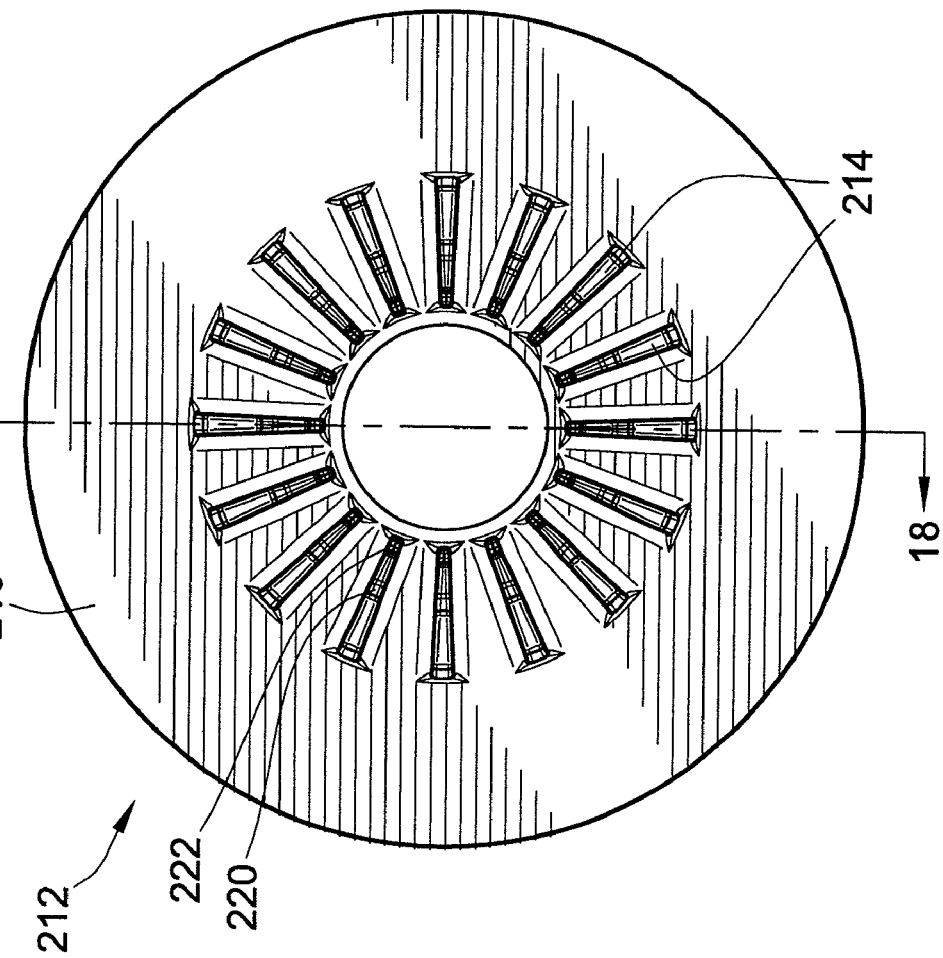

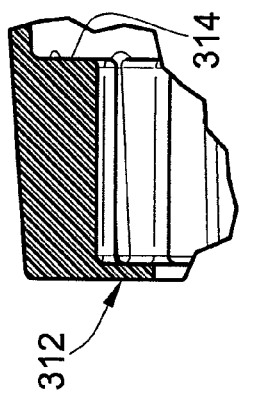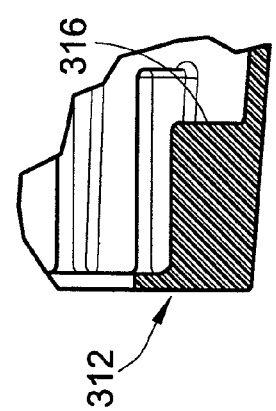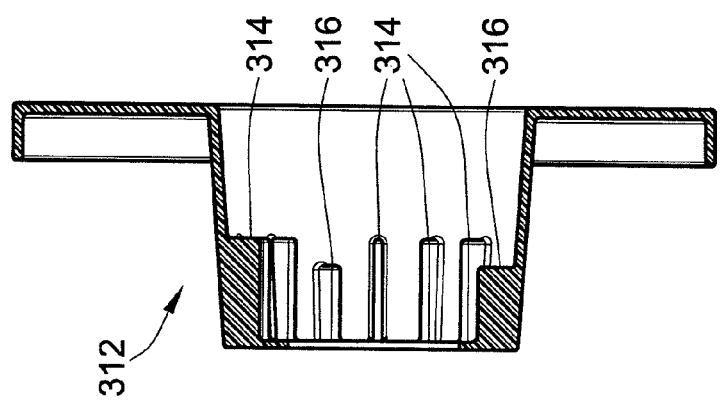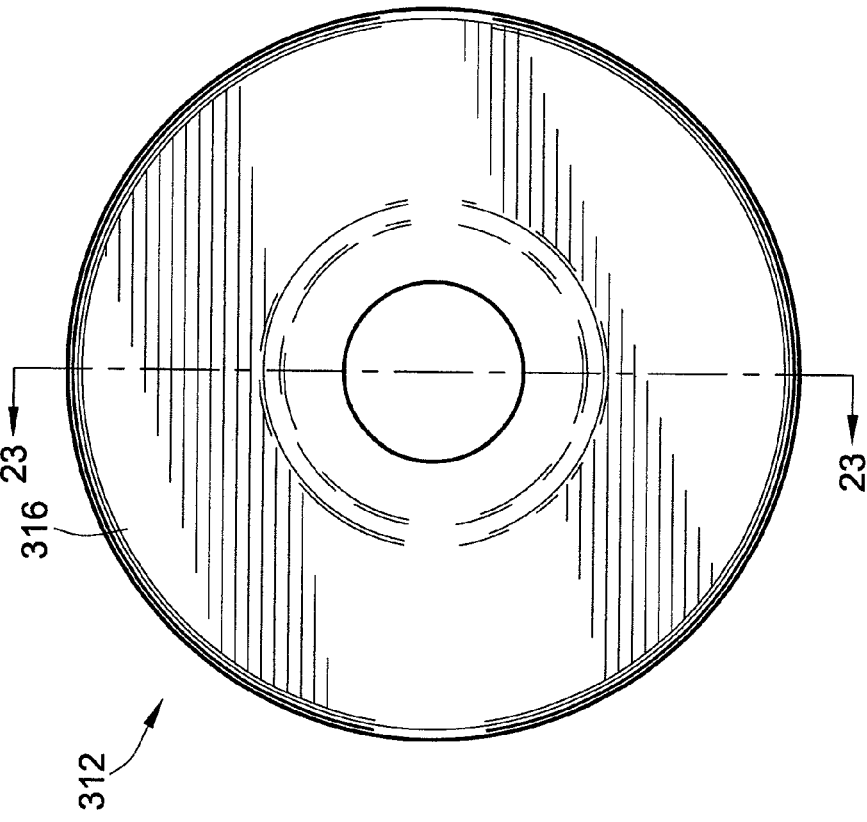

FUEL FILTER CARTRIDGE AND KEYED END CAP

CROSS-REFERENCE TO RELATED PATENT APPLICATIONS

This patent application is a continuation-in-part application of co-pending U.S. patent application Ser. No. 10/940,002, filed Sep. 13, 2004, the disclosure and teachings of which are incorporated herein in their entireties, by reference thereto.

FIELD OF THE INVENTION

The present invention generally relates to filters and their components and more particularly relates to filter cartridges and end caps therefore which are configured to engage flow control valves in filter housings.

BACKGROUND OF THE INVENTION

The present invention relates to keyed fuel filter cartridges for a fuel filter housing which has a keyed latch shut-off valve as shown for example in U.S. Pat. Nos. 6,495,042 and 6,550,000, the entire disclosures of which are hereby incorporated by reference. As disclosed generally in these patents, stepped keys are provided in a recess formed in the bottom end cap of a fuel filter cartridge. Each of the stepped keys includes a valve actuation portion and a latch actuation portion, whereby the keys are used to unlock a latched device and move a valve element and uncover a fuel flow port in a standpipe of a valve housing. It is known that these fuel filter cartridges are periodically replaced from time to time, but the fuel filter housing is permanent and typically reused. In these applications the fuel filter cartridge is pulled from the fuel filter housing which returns the valve to the closed position and the latch mechanism to the lock position. As a result, when a new filter cartridge is installed there is a need to be able to again unlatch the latch device and then move the valve element to uncover the opening in the standpipe. The present invention relates to a fuel filter cartridge and end cap which may be used and applied to such fuel filter housings as disclosed in the '042 and '000 patents referenced above, or that may have other application.

BRIEF SUMMARY OF THE INVENTION

One aspect of the present invention is directed toward a fuel filter. The fuel filter includes a tube of filter media surrounding a longitudinal axis. A first end cap is placed on the first end of the tube of filtering media. The first end cap defines a first annular trough that is filled with potting compound to connect and seal the first end cap to the tube of filtering media. The first end cap defines a first central opening surrounding the longitudinal axis. A second end cap is located on the second end of the tube of filtering media. The second end cap includes an outer annular skirt portion, an inner annular skirt port and a disc portion therebetween. The second end cap defines a second annular trough along the disc portion between the skirt portions which has potting compound therein which connects and seals the first end cap to the tube of filtering media. The second end cap defines a second central opening which surrounds the longitudinal axis. Unlike the prior art, a plurality of keys are located on the disc portion and project axially from the disc portion in a direction away from the filtering media. The keys are arranged in an annular array surrounding the axis.

Another aspect of the present invention is directed toward an end cap for such a fuel filter cartridge. The end cap includes an outer annular skirt portion, an inner annular skirt portion and a disc portion therebetween. An annular trough is formed along the disc portion between the skirt portions on an underside of the end cap. A central opening is formed into the disc portion and surrounds the longitudinal axis. A plurality of keys are located on the disc portion and project axially from the disc portion. These keys are arranged in an annular array which surrounds the axis.

According to a different aspect and different embodiment of the present invention, a fuel filter comprises a tube of filtering media and first and second end caps placed upon opposing ends of the tube of filtering media. One of the end caps includes a cylindrical recess structure. Located in the recess structure is a first plurality of keys which project in the recess in an annular array and a second plurality of keys projecting in the recess in an annular array which are of a different characteristic than the first plurality of keys.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a bottom end view of the bottom end cap for the fuel filter of the first embodiment shown in FIG. 1.

FIG. 6 is a cross-section of FIG. 5 taken about line 6-6.

FIGS. 7 and 8 are enlarged views of different portions of FIG. 6.

FIG. 11 is a plan bottom view of the second embodiment of the end cap shown in FIG. 9.

FIG. 12 is a cross-section of FIG. 11 taken about line 12-12.

FIGS. 13 and 14 are enlarged views of different portions of FIG. 12.

FIG. 17 is a bottom plan view of the end cap according to the third embodiment shown in FIG. 15.

FIG. 18 is a cross-section of the end cap shown in FIG. 17.

FIGS. 20 and 21 are isometric views of a bottom end cap for use in a fuel filter cartridge according to a fourth embodiment in which FIGS. 20 and 21 show different perspectives of the bottom end cap.

FIG. 22 is a plan view of an inward side of the bottom end cap of the fourth embodiment shown in FIGS. 20 and 21.

FIG. 23 is a cross-section of the end cap shown in FIG. 22.

FIGS. 24 and 25 are enlarged portions of different segments of the cross-section shown in FIG. 23.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
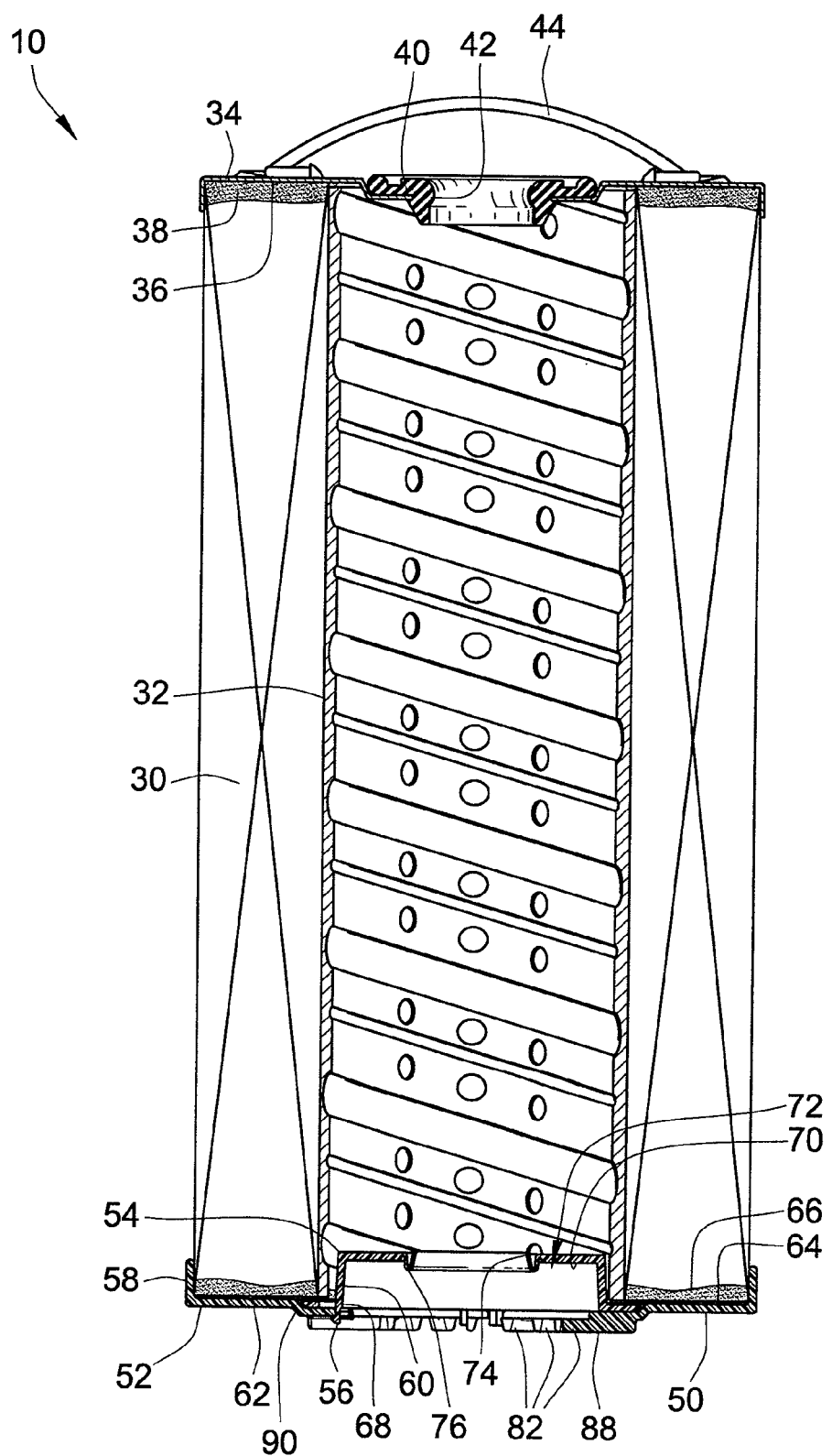
FIG. 1 is a cross-section of a fuel filter cartridge in accordance with a first embodiment of the present invention.
Figure 2:
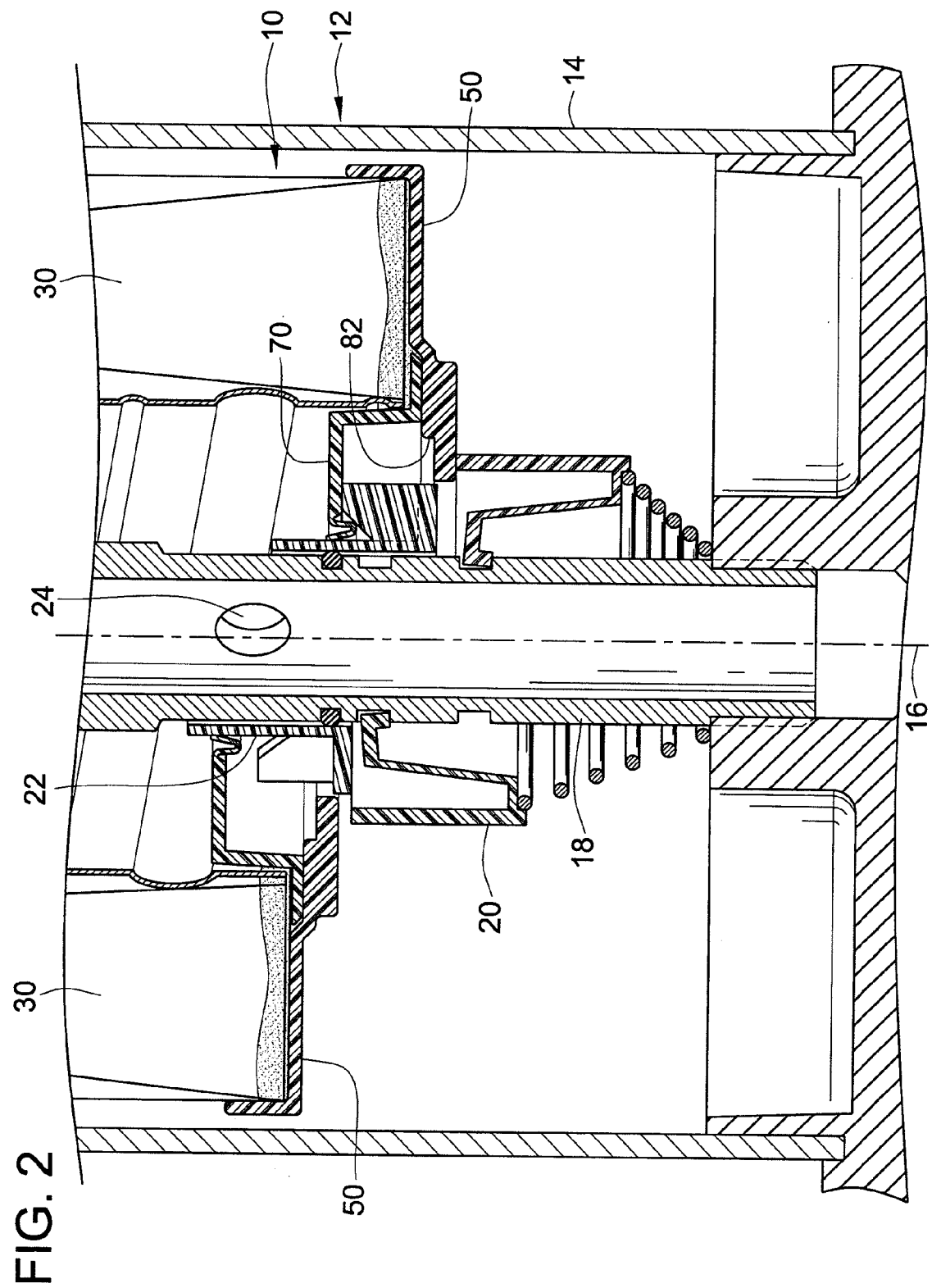
FIG. 2 is a cross-section of the bottom end cap portion of the fuel filter cartridge shown in FIG. 1 as installed on a standpipe in a fuel filter housing and engaging a latch and valve mechanism therein.
Figure 3:
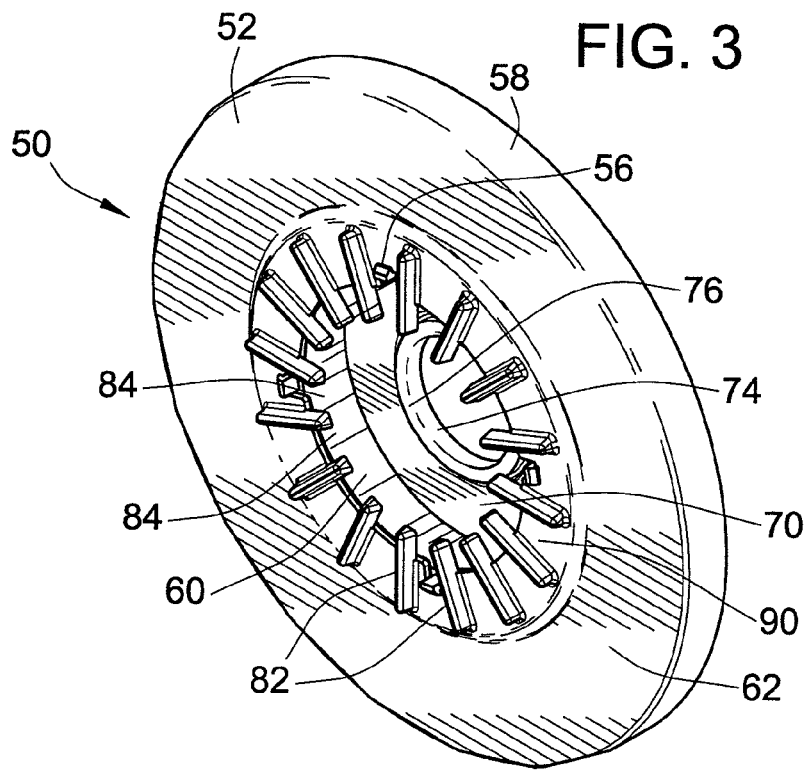
FIG. 3 is an isometric view of the bottom end cap of the fuel filter cartridge of FIG. 1.
Figure 4:
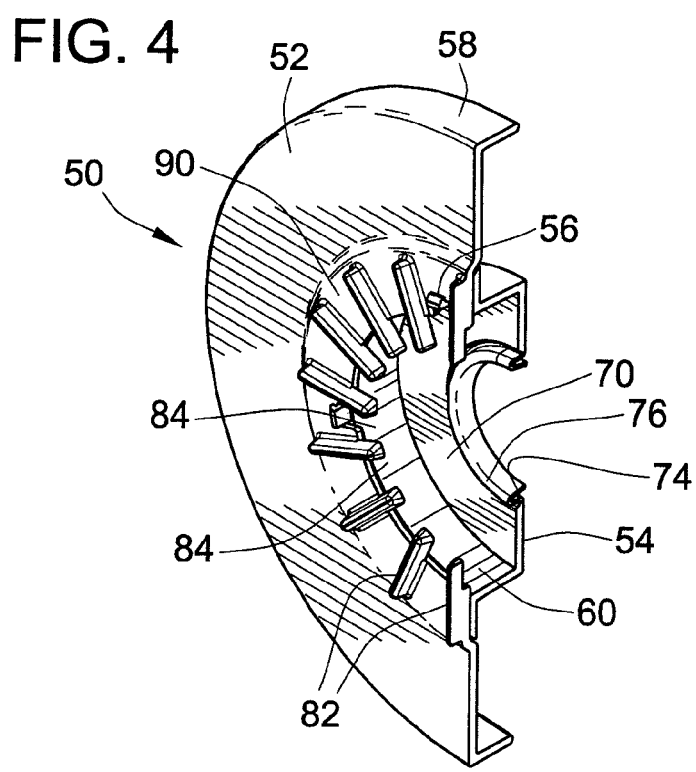
FIG. 4 is a view similar to FIG. 3, but with the end cap cut in half.
Figure 9:
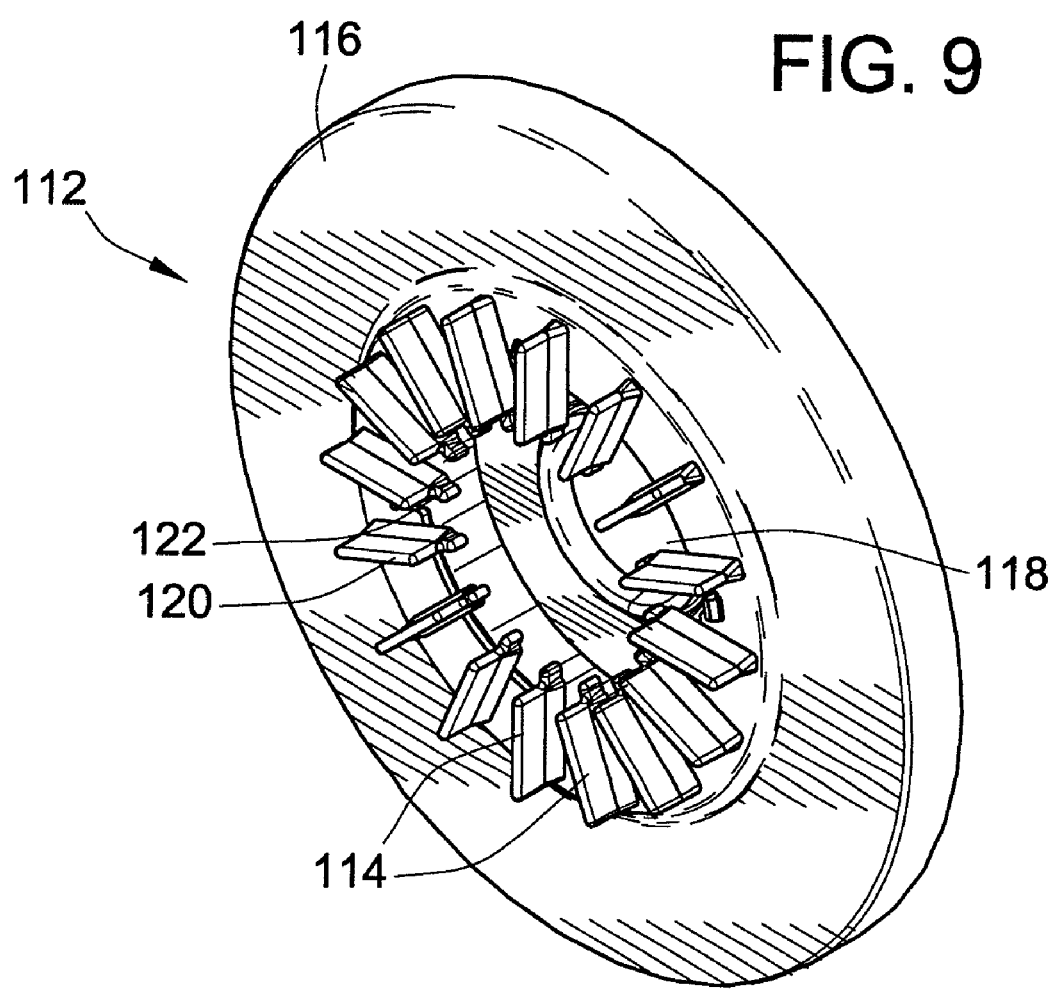
FIG. 9 is a view of a bottom end cap of a second embodiment of the present invention for a fuel filter cartridge.
Figure 10:
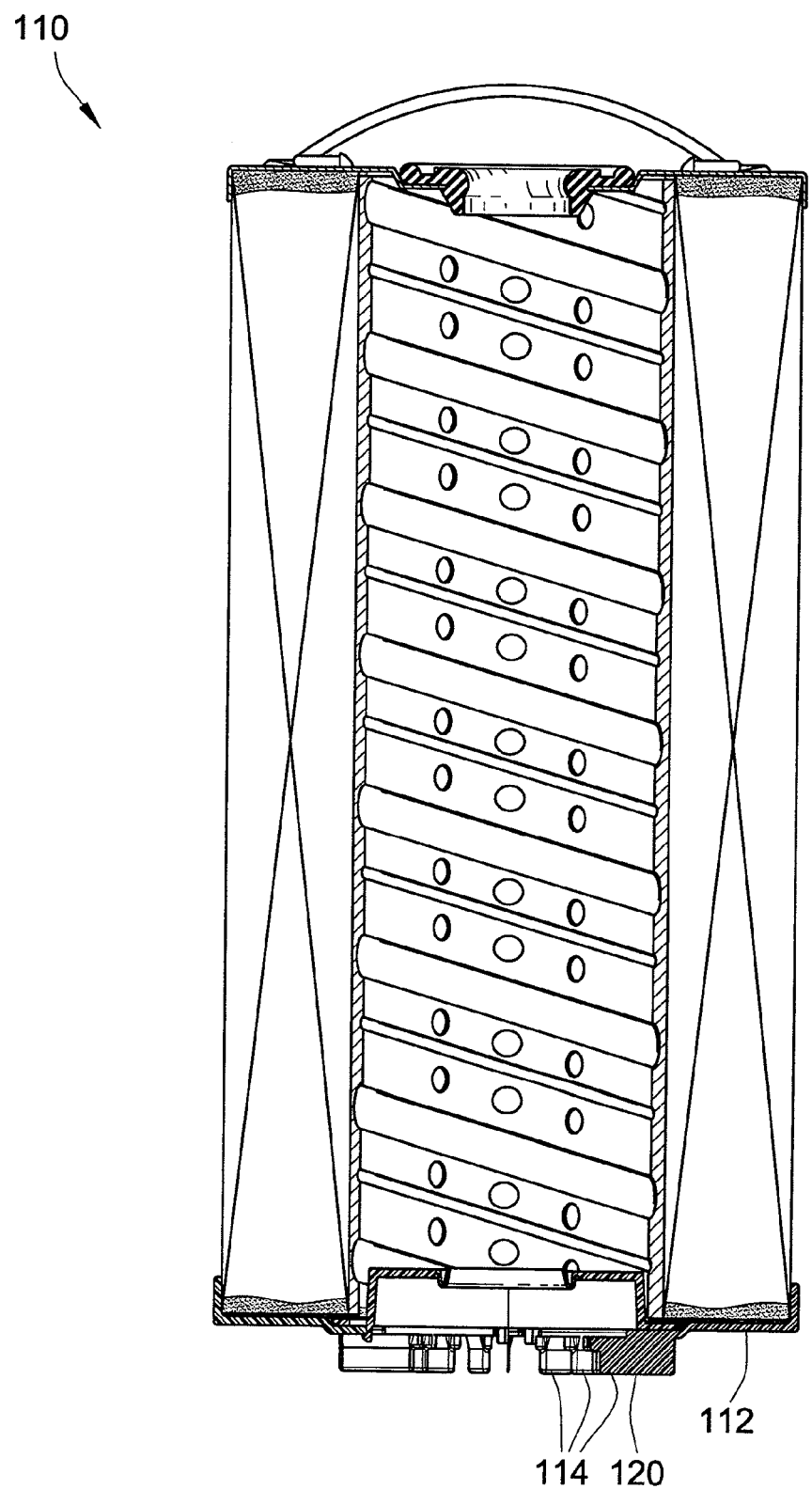
FIG. 10 is a view of the end cap of the second embodiment as mounted on a filter cartridge.
Figure 15:
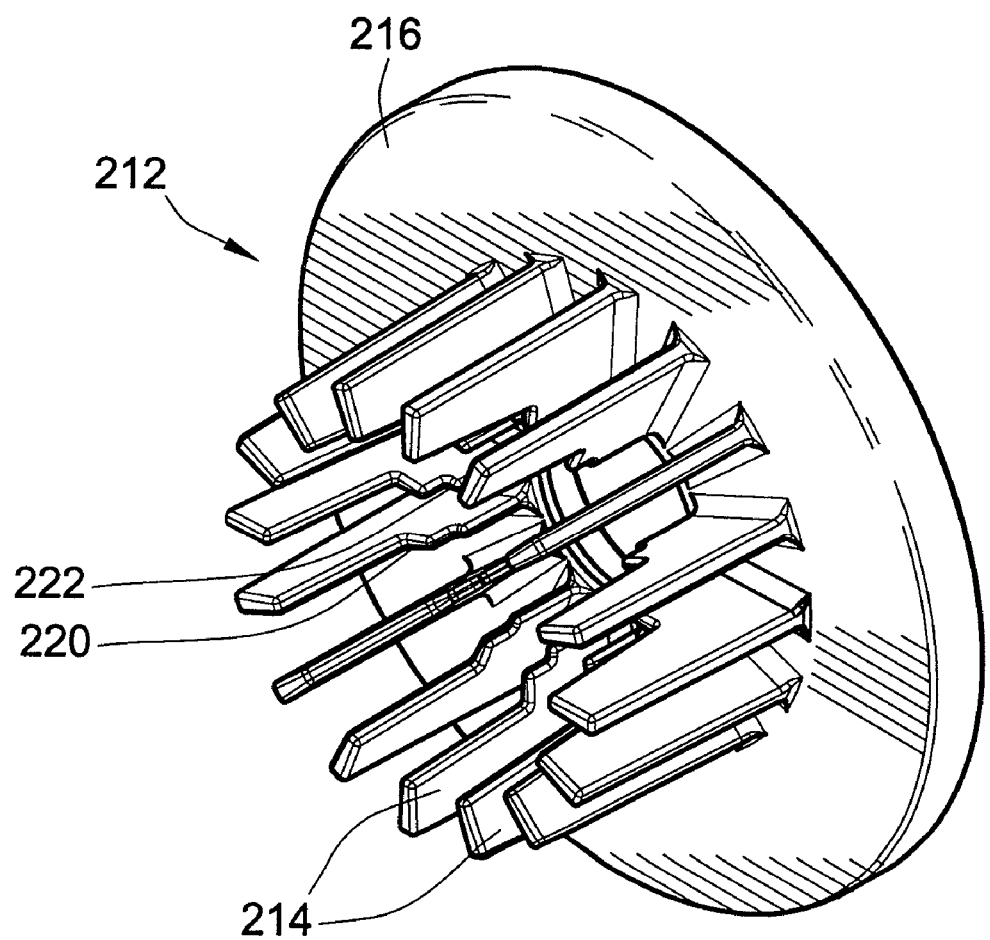
FIG. 15 is an isometric view of a third embodiment of the end cap which may be used on a filter cartridge.
Figure 16:
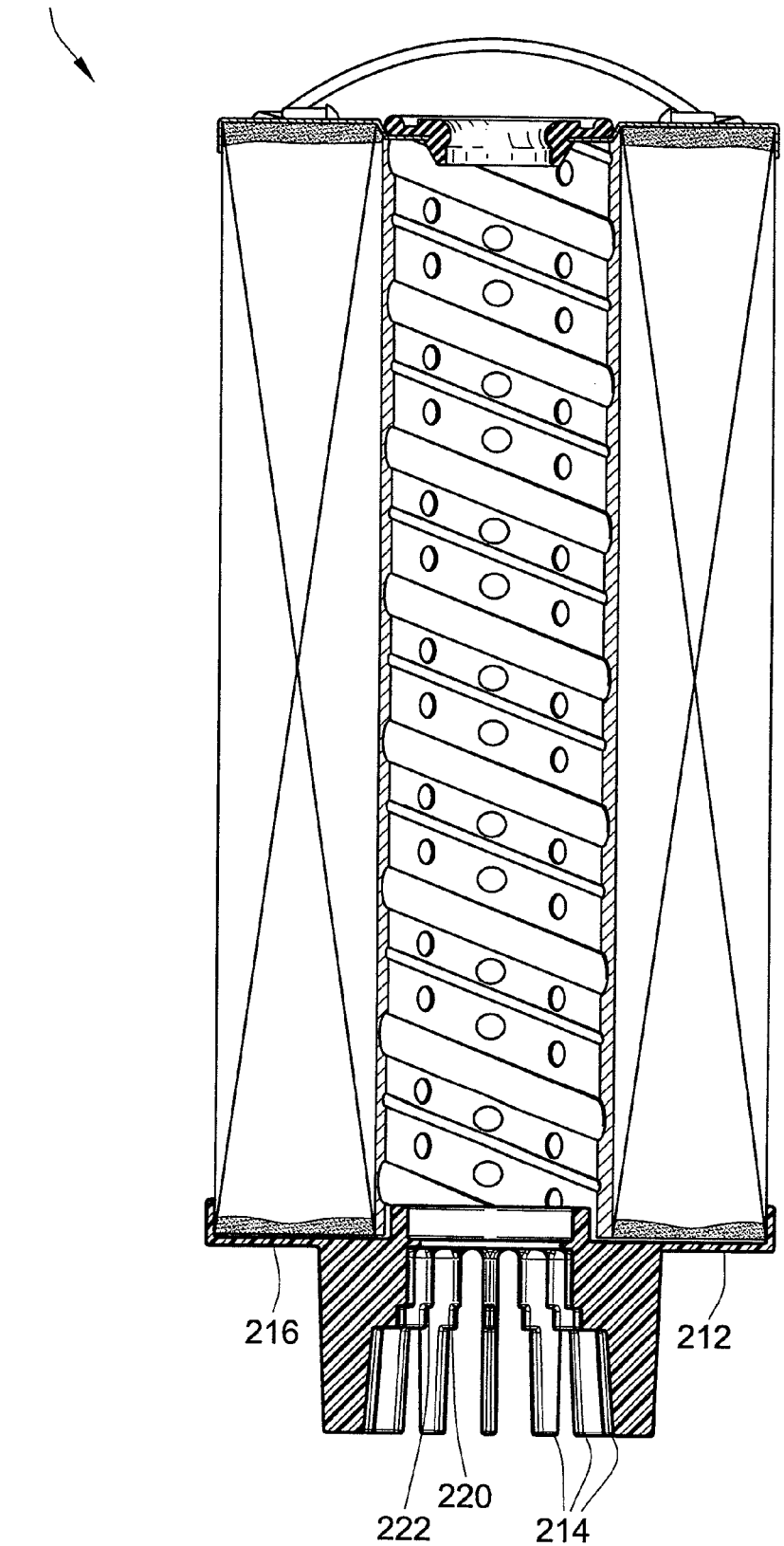
FIG. 16 is a view of the third embodiment of the end cap shown in FIG. 15 as mounted on a fuel filter cartridge.
Figure 19:
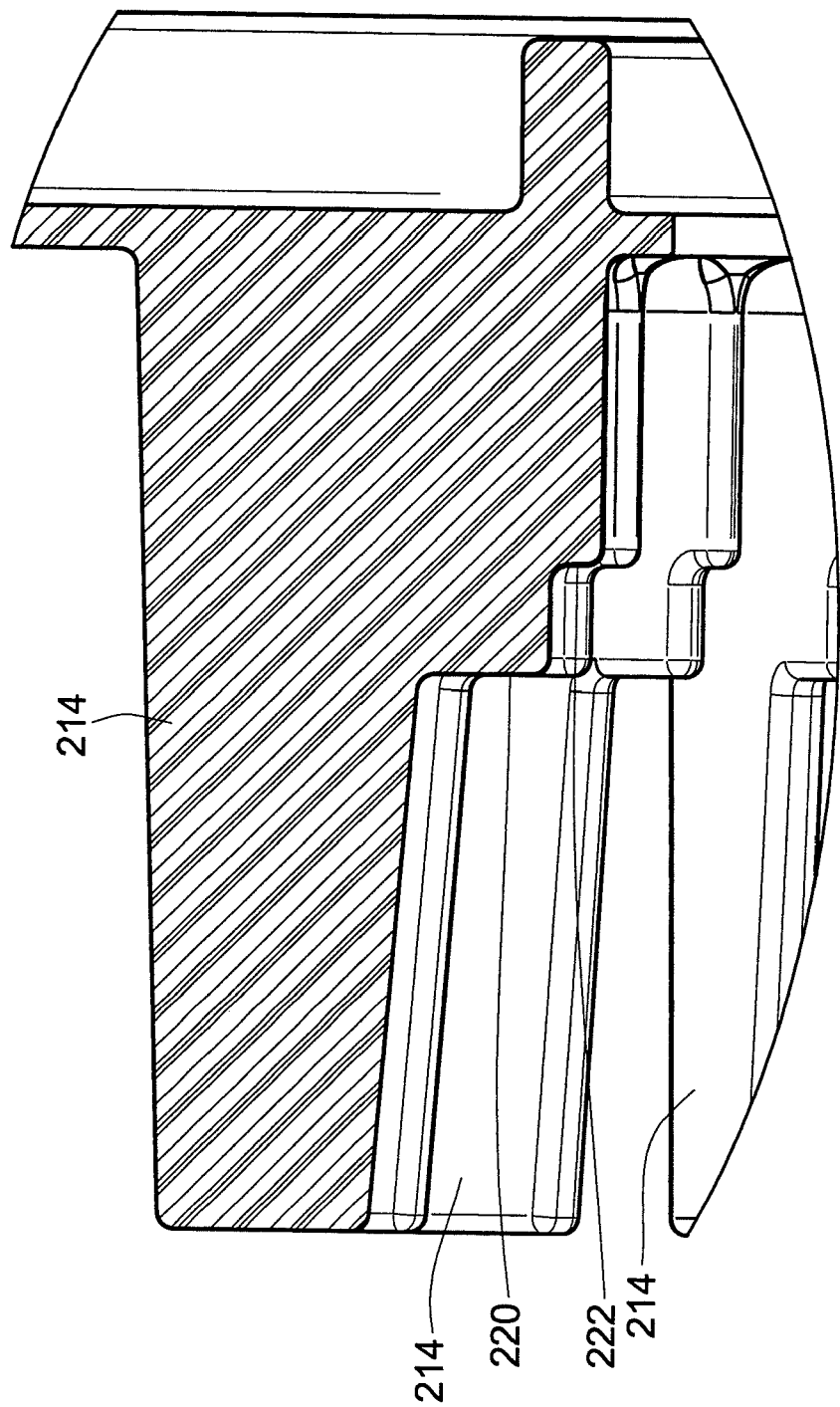
FIG. 19 is an enlarged view of a portion of FIG. 18.
Figure 20:
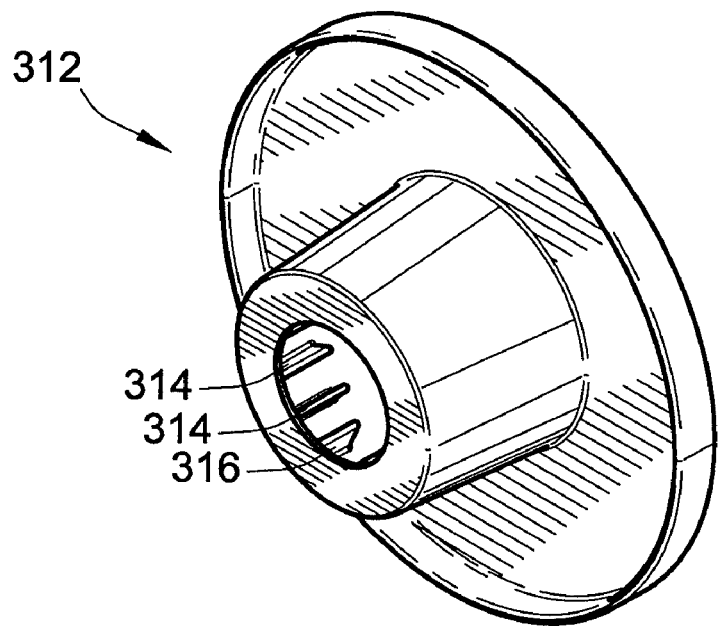
Figure 21:
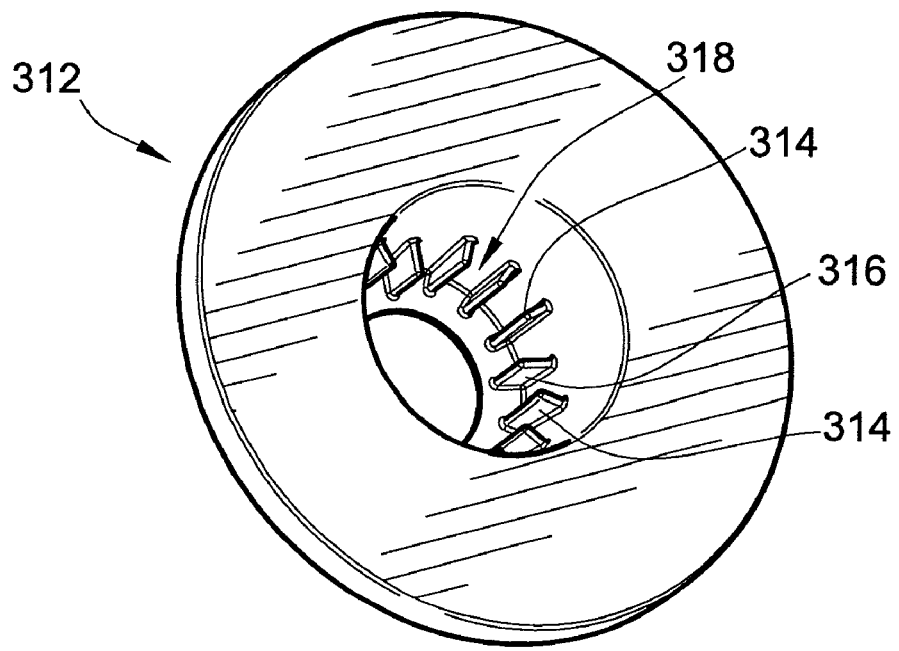
Figure 26:
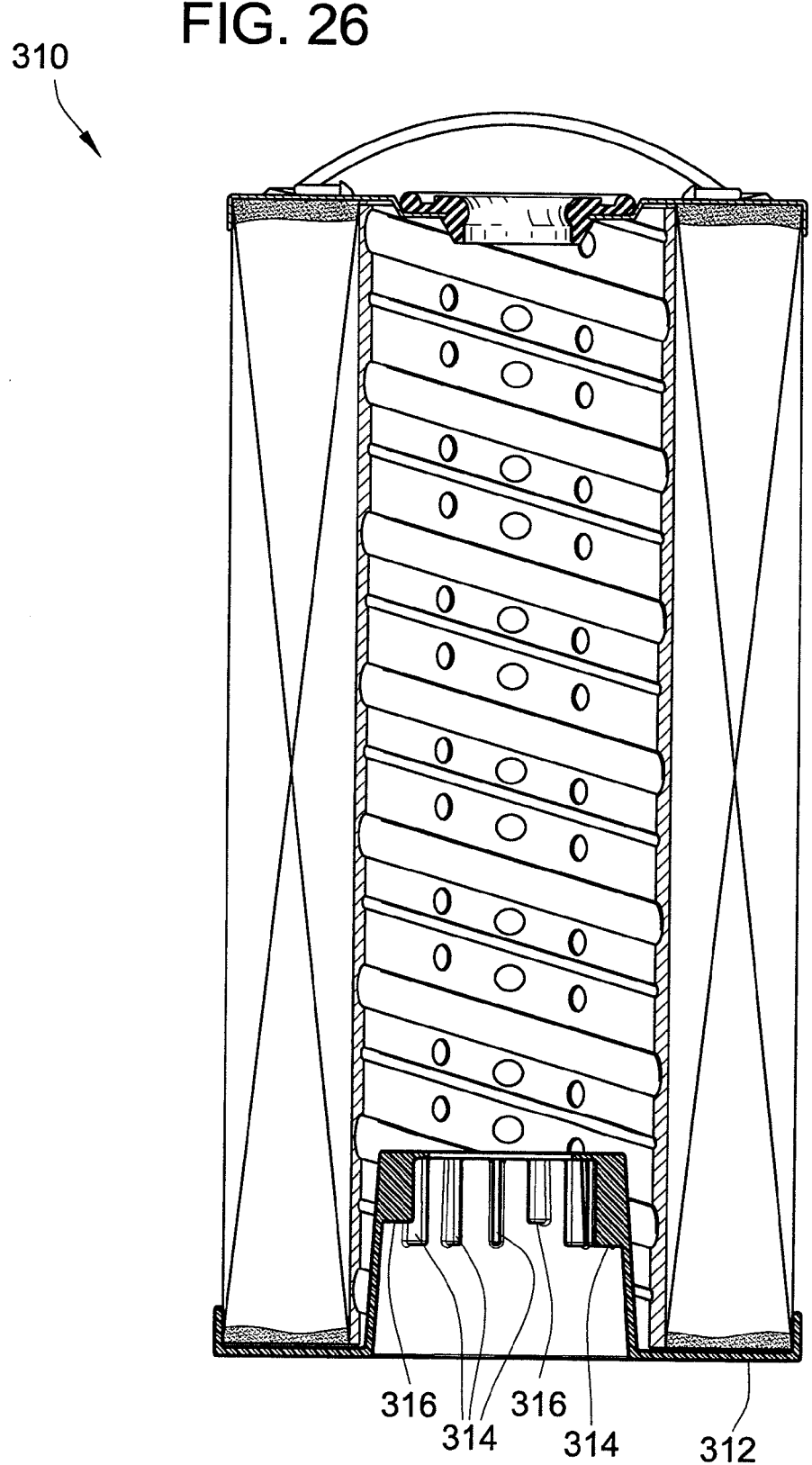
FIG. 26 is a view of the end cap of the fourth embodiment as mounted on a filter cartridge.

Referring to the first embodiment of FIGS. 1-8, the invention is embodied in a fuel filter cartridge 10 as shown in FIG. 1 which is removably installed into a fuel filter housing 12, the relevant portions of which are shown in FIG. 2. This housing 12 depicts an exemplary environment in which the fuel filter cartridge 10 will operate. As shown therein, the fuel filter housing includes a container 14 into which the fuel filter cartridge 10 is axially inserted along a longitudinal axis 16 (longitudinal axis 16 also designates the central axis for the fuel filter cartridge 10). Concentric and co-axial with the longitudinal axis is a fuel standpipe 18 which carries a spring loaded latch device 20 in the form of a sleeve and a flow control valve 22 which opens and closes a fuel flow port 24 that extends radially through the standpipe 18. As shown in FIG. 2, different halves of the longitudinal axis 16 depict different engagement positions at different stages of axial insertion of the fuel filter cartridge 10 into the fuel filter housing 12. As shown therein, the fuel filter cartridge 10 will first engage the latch device 20 and then subsequently engage the valve 22 to uncover the flow port to allow for fuel flow from the central region of the fuel filter cartridge 10 into the standpipe 18. Further details of such a fuel filter housing and standpipe can be had to the referenced patents set forth in the background above.

With an exemplary operating environment for the present embodiment being understood, attention will now be directed toward the fuel filter cartridge 10. The fuel filter cartridge 10 generally includes a cylindrical tube of filtering media 30 that is concentric around the longitudinal axis 16. The tube of filtering media 30 may comprise a cylindrical ring of pleated filter paper, or may comprise other suitable filtering media. A perforated metal or plastic central support tube 32 may be provided concentrically inside the filtering media 30 to provide for radial support to the filtering media 30. The support tube 32 provides support for the media 30 when fuel is flowing radially inward through the filtering media 30.

At the top end of the filter cartridge 10 with the given orientation shown in FIG. 1, there is a top end cap 34. The top end cap 34 defines an annular trough 36 along the underside thereof. The annular trough 36 that receives potting compound 38 (such as plastisol, adhesive or other suitable bonding agent) which connects and seals the top end cap 34 to the top end of the filtering media 30. The top end cap 34 defines a central opening 40 which is sized to receive the standpipe 18 therethrough. Along the inner lip of the central opening 40 the top end cap 34 carries an annular gasket 42 which engages and seals against the standpipe 18 shown in FIG. 2 when installed into the fuel filter housing 12. A collapsible handle 44 may also be mounted to the top end cap 34 to provide a means for ready removal of the fuel filter cartridge at filter change interval time. The handle 44 can be pulled to facilitate removal of the fuel filter cartridge Turning to the bottom side of the filter cartridge 10, a bottom end cap 50 is provided. The bottom end cap 50 may be comprised of two separate component plastic parts including a generally plate-shaped member 52 and a generally ring-shaped member 54 which are assembled together as shown. One method for assembling the two members 52 and 54 together is a snap-lock connection in which snap tabs 56 projecting from one of the members 54 is snapped onto corresponding structure on the other member 52 to form the bottom end cap 50.

The bottom end cap 50 once assembled includes an outer annular skirt 58, an inner skirt 60 and a generally planar disc portion 62 therebetween. The combination of these structural portions provides an annular trough 64 which is received onto the bottom end of the filtering media 30 and connected and sealed thereto by potting compound 66. The inner periphery of the disc portion 62 defines a central opening 68 which may be recessed into the filtering media 30 as indicted via the inner skirt 60. The inner skirt 60 extends axially inward and terminates in a radially inward extending bottom wall 70 to form a generally cylindrical recess 72. The bottom wall 70 is generally planar in nature and extends radially inward toward a further central opening 74 that is of a smaller diameter than the outer central opening 68. The bottom wall 70 in this embodiment is used as the valve actuation means as shown in FIG. 2. Surrounding the central opening 74 is a loop structure or lip 76 which is configured to slidably engage the standpipe and provides for some flexibility to allow for easier axial installation and location features. The lip 76 which extends axially also flexes slightly inwardly and outwardly radially relative to the standpipe.

Since the valve 22 cannot be actuated without first removing the protective latch device 20 as shown in FIG. 2, the bottom end cap 50 also provides means for engaging the latch device which is shown in the form of an annular array of keys 82. The keys 82 are not located in the recess 72 but are located on the disc portion 62 and project axially from the disc portion 62 in an outward direction, which is away from the filtering media 30. The keys 82 are arranged in an annular array which surrounds the central longitudinal axis 16.

As shown in the figures, the keys 82 project radially inward past the outer central opening 68 in a cantilever manner such that gaps 84 are formed between adjacent keys to provide suitable clearance for use with the associated standpipe and valve/latch mechanism. The keys are arranged and spaced to provide means for releasing the latch device 20 of the flow control valve 22 in the filter housing. The keys 82 are configured and spaced relative to the valve actuating bottom wall 70 so as to compliment the configuration of the latch device 20 and valve 22 of the fuel filter housing. To achieve this, the keys 82 only extend partially radially inward and short of the diameter of the inner central opening 74. With this configuration, there is no longer a requirement that the outer face of the keys be stepped. Instead as shown the keys 82 may have an outer surface 88 which is relatively straight in the radial direction. The keys 82 may also be elevated slightly by a raised annular plateau portion 90 which is formed into the disc portion 62 of the plate-shaped member 52. This raised plateau portion 90 also provides along the inward side a recess area to receive a radial projection of the ring-shaped member 54 and thereby provide a flat underside surface for the annular trough 64 to better ensure connection and sealing between the bottom end cap 50 and the filtering media 30 via the potting compound 66.

Turning to the second embodiment of the present invention shown in FIGS. 9-14, a disposable fuel filter cartridge 110 is illustrated which will be understood to be similar in most material respects to FIG. 1, with the primary exception being the configuration and keying mechanism of the bottom end cap 112. Accordingly, focus as applied to this embodiment will be directed to the principle distinctions. In this embodiment, the bottom end cap 112 still includes keys 114 which project from the disc portion 116 of the bottom end cap 112. Similar to the first embodiment, the keys 114 avoid and are clear of the recess structure 118 formed into the bottom end cap 112. However, as opposed to the first embodiment where the bottom wall of the recess provides the valve actuation means, in this embodiment the keys 114 themselves provide for both the latch actuation means and the valve actuation means. In particular, the keys 114 are stepped to include a first latch actuation surface 120 and a second valve actuation surface 122. These surfaces 120, 122 are both axially and radially spaced with a configuration and spacing that is complimentary to that of the latch device and valve of a corresponding fuel filter housing.

Turning to a third embodiment of the present invention, with reference to FIGS. 15-19, it will be understood that the fuel filter cartridge 210 of the third embodiment is much like the earlier two embodiments with a principle distinction being the configuration and shape of the bottom end cap 212. In this embodiment, the bottom end cap 212 may be formed of a single unitary member rather than two component part members which are assembled together. Further, this embodiment eliminates the recess structure of prior embodiments and instead the keys 214 are formed on the outer face or disc portion 216 of the bottom end cap projecting axially outward therefrom (in a direction away from the filtering media). Similar to the second embodiment, these keys 214 also include a stepped surface to include a latch actuation surface 120 and a valve actuation surface 122 which are both radially and axially spaced relative to each other. A potential advantage of an embodiment like this is that the inner diameter of the filtering media may be moved inwardly if desired (e.g. the inner diameter of the filtering media may be smaller).

A fourth embodiment of a fuel filter cartridge 310 is shown in FIGS. 20-26, which will be understood to be in many respects similar to the earlier embodiments of fuel filter cartridges again with the principle exception being the configuration and operation of the bottom end cap 312. This embodiment has significant distinctions as opposed to the earlier embodiments in that at least two different type of keys 314, 316 are provided. Also opposed to earlier embodiments, the keys 314 and 316 are not disposed on the end face of the bottom end cap 312, but instead located and supported in the cylindrical recess 318 of the bottom end cap 312. However, rather than providing for a complex stepped surface on each of the keys, this embodiment uses two different types of keys 314, 316 of a different characteristic. In particular, the first set of keys 314 are axially longer and radially skinnier that the second set of keys 316. In this manner, one set of the keys 314 are used to engage and unlock the latch device while the other set of keys 316 are used to actuate the valve and thereby open the flow port. The two sets of keys 314 and 316 are arranged in a common circular array. Also, the keys 314, 316 of this embodiment are not cantilevered with the support only along one side, but instead supported along two different sides of each of the keys including a first side connected to the inner annular skirt and a second side connected to the bottom wall.

Figure 27:
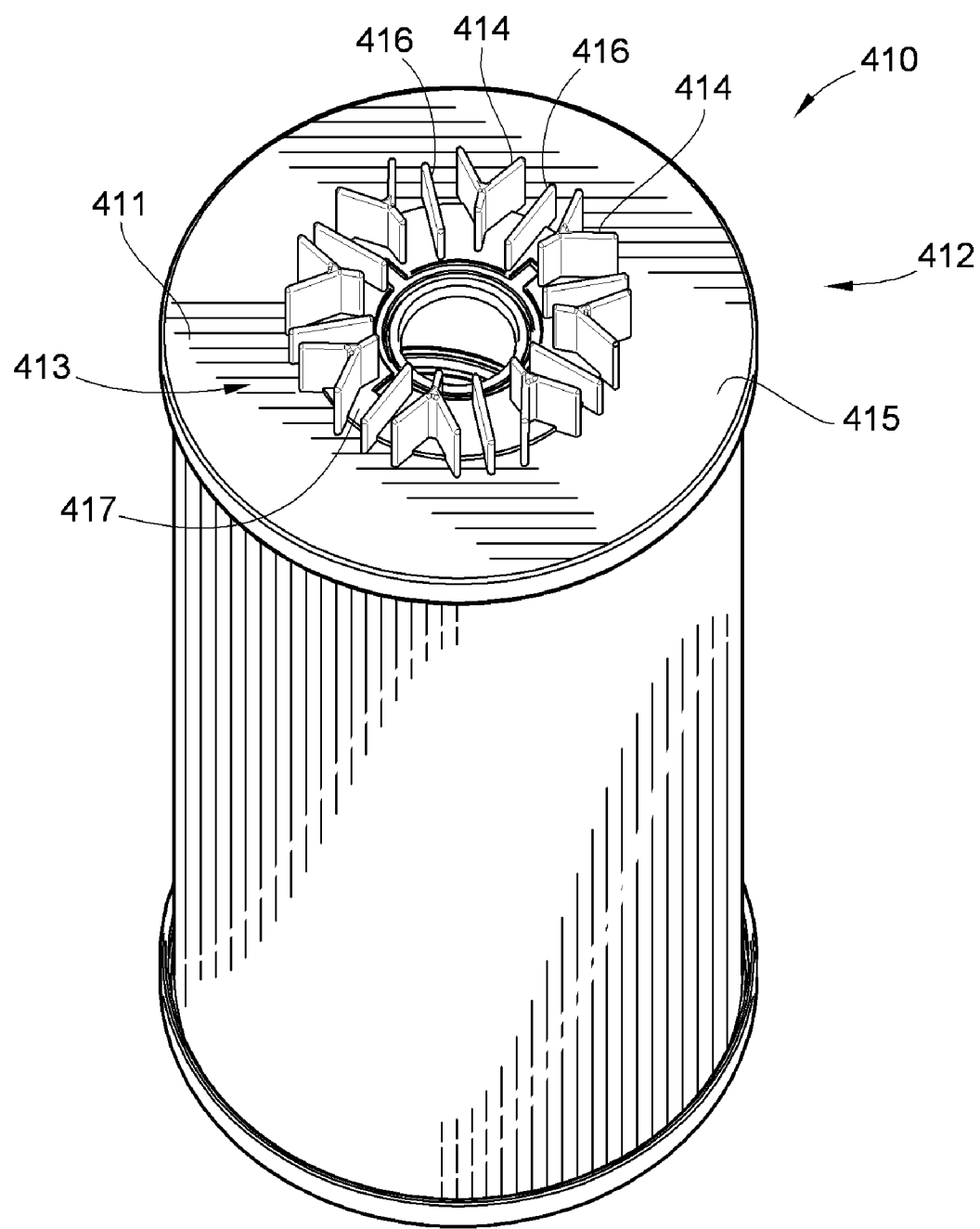
FIG. 27 is an isometric view of a fifth embodiment of a filter cartridge.
Figure 28:
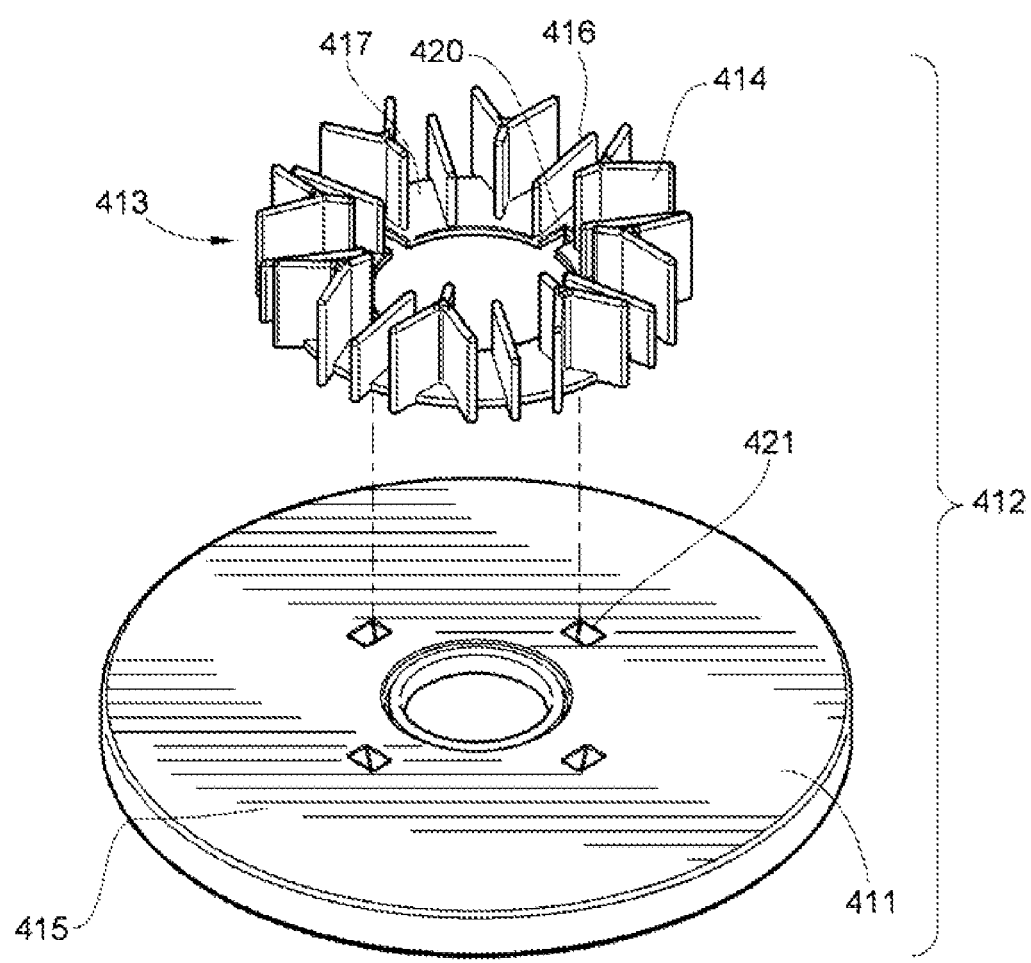
FIG. 28 is an exploded illustration of the end cap of the filter cartridge shown in FIG. 27.
Figure 29:
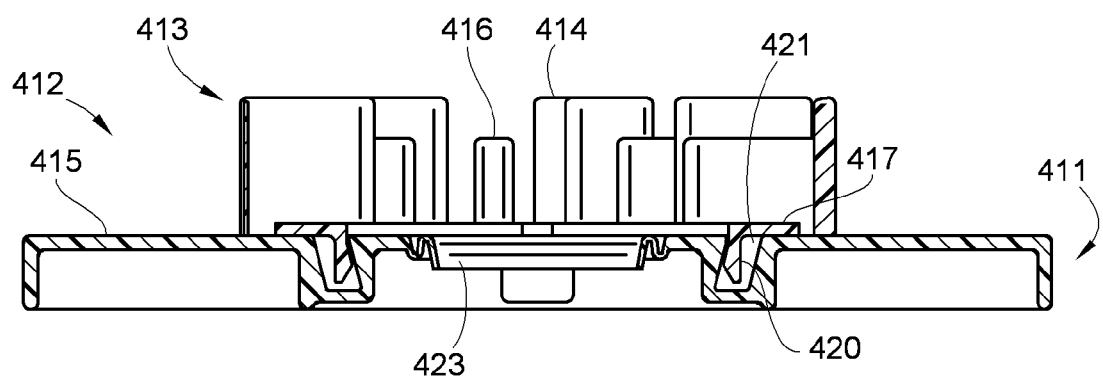
FIG. 29 is a cross-section of the end cap shown in FIG. 28.

A fifth embodiment of a filter cartridge 410 is shown in FIG. 27, which will be understood to be in many respects similar to the earlier embodiments of fuel filter cartridges, with the principle exception being the configuration and operation of the bottom end cap 412. Additional reference may be had to FIGS. 28 and 29. This end cap embodiment is a multi-part embodiment that includes two portions including a cap portion 411 and a key portion 413. The key portion 413 is preferably snap-fit engaged to an end face of cap portion 411. The cap portion 411 includes cavities 421 formed in ring or disc portion 415 that receive prongs 420 of the key portion 413 to facilitate the snap-fit engagement. The prongs 420 extend from a generally annular disc portion 417.

The key portion 413 includes at least two different types of keys 414, 416 interconnected to one another by the disc portion 417. Due to the arrangement of the key portion 413 relative to the cap portion 411, the keys 414, 416 are disposed on the end face of end cap 414. However, rather than providing for a complex stepped surface on each of the keys, this embodiment uses two different types of keys 414, 416 of a different characteristic. In particular, the first set of keys 414 are axially longer that the second set of keys 416. In this manner, one set of the keys 414 are used to engage and unlock the latch device while the other set of keys 416 are used to actuate the valve and thereby open the flow port.

Further, the first set of keys 414 have a different shape characteristic than the second set of keys 416. The first set of keys 414 are "Y-shaped" including a base portion extending substantially radially outward and two leg portions extending at non-zero angle relative to the base portion. As illustrated, the two leg portions extend at acute angles relative to the base portion and the base portion bisects an angle formed by the two leg portions, but the base portion does not extend between the two leg portions in this embodiment. Preferably, the keys of a given set are arranged in a common angular array. The second set of keys 416 are generally planar. The base portion includes a distal end that is radially inward of the leg portions and the connection between the base portion and the leg portions.

The cap portion 411 includes an axially extending central opening surrounded by a loop structure or lip 423 which is configured to slidably engage the standpipe and provides for some flexibility to allow for easier axial installation and location features. The lip 423, which extends axially also flexes slightly inwardly and outwardly radially relative to the standpipe.

It should be noted, that although this end cap embodiment is illustrated as being a multi-part end cap, it is contemplated that the two end cap portions 411, 413 could be formed in a unitary one piece construction in other embodiments.

Figure 30:
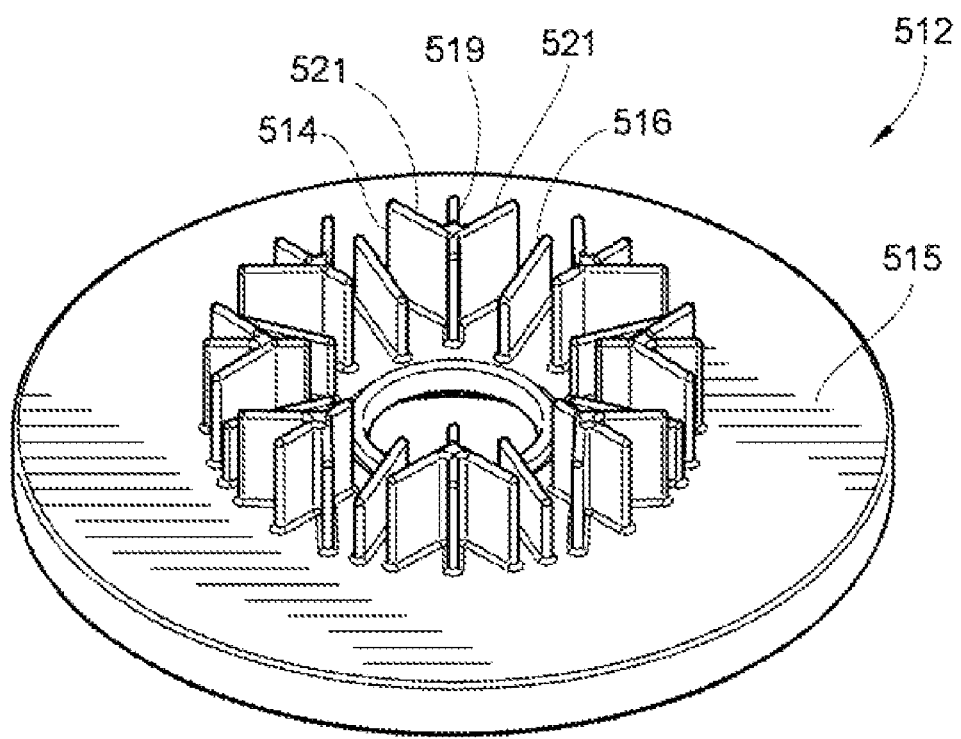
FIG. 30 is an isometric view of a sixth embodiment of a filter cartridge which may be used on a filter cartridge.
Figure 31:
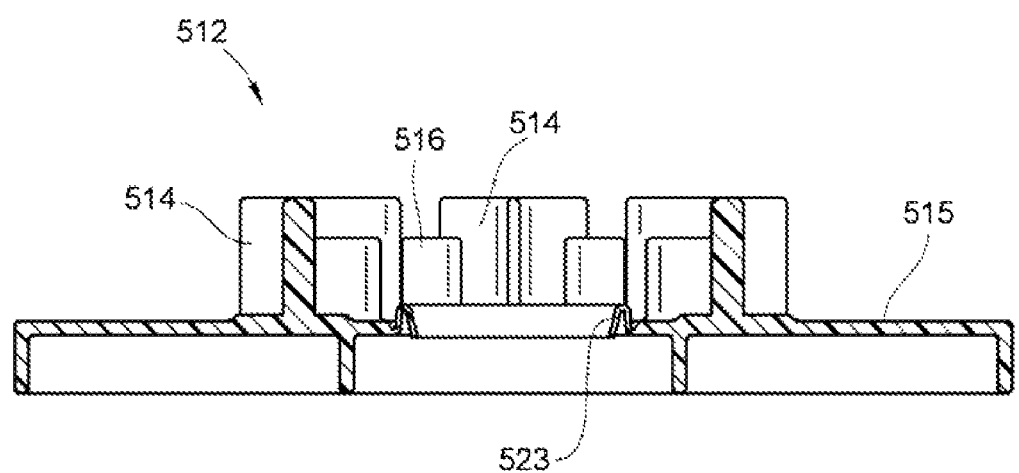
FIG. 31 is cross-section of the end cap of FIG. 30.

A sixth embodiment of an end cap 512 for use in a filter cartridge according to the present invention is provided in FIGS. 30 and 31. This embodiment is similar to the embodiment illustrated in FIGS. 27-29 in many respects except that the first set of keys 514 is configured differently than the embodiment in FIGS. 27-29. In this embodiment, the first set of keys 514 is generally "crowfoot-shaped". Alternatively, the keys 514 could be viewed as being "Y-shaped" with the base 519 extending radially outward such that a portion is interposed between the two leg portions 521 forming the Y-shape. As illustrated, the base 519 bisects the angle formed by the two leg portions 521. Again, the first set of keys 514 is axially longer than the second set of keys 516.

The base portion 519 includes a first distal end that is radially inward of the leg portions 521 and the connection between the base portion 519 and the leg portions 521 as well as a second distal end that is interposed between the two leg portions 521. Generally, the portion of the base portion 519 between the first distal end and the intersection of the leg portions 521 and the base portion 519 is used to engage the latch of the valve. However, this is not required in practicing embodiments of the present invention.

The Y-shape or crowfoot shape of the previous two embodiments facilitates manufacture of the filter element. The increased material provided by and angled orientation of the legs (i.e. legs 519) prevent deformation of the keys 414, 514 when filter media is secured to the end caps 414, 416. Further, the Y-shape or crowfoot shape increases or widens the foot print of the keys to increase stability of the end cap when riding on a conveyor during manufacturing.

In this embodiment, the keys 514, 516 are directly formed into the disc portion 515 of the end cap 512. As such, the end cap 512 is a one-piece unitary construction. Again, the end cap 512 includes an axially extending central opening formed by a sealing lip 523.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly, comprising:
   a filter housing defining a housing cavity;
   a valve assembly within the housing cavity, the valve assembly including:
      a central standpipe defining a central flow passage including a flow port;
      a flow control valve including a valve portion surrounding the standpipe and axially movable therealong between a closed position wherein the valve portion covers the flow port preventing fluid flow therethrough and an open position wherein the valve portion is positioned to uncover the flow port and permit fluid flow therethrough;
   a filter element within the housing cavity of the filter housing, the filter element engaging the flow control valve and maintaining the flow control valve in the open position, the filter element including:
      a tube of filter media extending between opposed first and second ends and surrounding a longitudinal axis;
      a first end cap sealingly connected to the first end of the tube of filter media;
      a second end cap having an inner and outer face, the inner face sealingly connected to the second end of the tube of filter media, the first end cap, second end cap and filter media defining a central cavity therebetween, the second end cap including a disc portion including a central opening surrounding the longitudinal axis and opening to the central cavity;
      a first plurality of keys located on the outer face and axially projecting from the outer face in a direction extending away from the filter media, the first keys being arranged in a first annular array surrounding the longitudinal axis, and the first keys being axially spaced from the filter media, the keys acting upon the valve assembly and the filter element maintaining the flow control valve in the open position, the first keys extending radially outward beyond an inner diameter of the tube of filter media.

2. The filter assembly of claim 1, wherein gaps are formed between adjacent first keys completely angularly separating the adjacent first keys.

3. The filter assembly of claim 1, wherein the valve assembly further comprises a latch device movable axially along the central standpipe, the latch device having a locked position maintaining the flow control valve in the closed position and an unlocked position permitting the flow control valve to transition to the open position, the filter element engaging and maintaining the latch device in the unlocked position.

4. The filter assembly of claim 3, wherein each first key includes a first abutment face and a second abutment face, the first face spaced axially from the second face in a direction extending away from the first end cap and spaced radially outward relative to the second face, the first face axially abutting the latch device and the second face axially abutting the flow control valve.

5. The filter assembly of claim 4, wherein the first and second faces, the latch device, the abutment between the latch device and first keys and the abutment between the filter element and the flow control valve are axially spaced from the filter media.

6. The filter assembly of claim 3, wherein the second end cap axially abuts the flow control valve in the open position and the first keys axially abut the latch device.

7. The filter assembly of claim 5, wherein the first and second faces have a first axial spacing being greater than a second axial spacing between the corresponding portions of the latch device and flow control valve to which the first and second faces abut, respectively, such that the first face abuts the latch device prior to the second face abutting the flow control valve.

8. The filter assembly of claim 4, wherein the first keys and the second end cap are formed as a single unitary member and the filter element is removably positioned within the filter housing.

9. The filter assembly of claim 3, further comprising a plurality of second keys located on the outer face and projecting axially from the outer face in a direction extending away from the filter media, the second keys being arranged in a second annular array surrounding the longitudinal axis, the first keys being independent of the second keys, the first keys engaging the latch device and the second keys engaging the flow control valve, the second keys being of a different characteristic than the first keys.

10. The filter assembly of claim 9, wherein the first keys have a longer axial length than the second keys.

11. The filter assembly of claim 9, wherein the first keys are angularly spaced from second keys and the first keys have a wider radial width than the second keys.

12. The filter assembly of claim 9, wherein the first keys have a radially inner most edge that is radially closer to the longitudinal axis than a radially inner most edge of the second keys.

13. The filter assembly of claim 1, wherein the first keys act upon the flow control valve and maintain the flow control valve in the open position.

14. The filter assembly of claim 9, wherein the first keys are generally Y-shaped and the second keys are generally planar.

* * * * *